United States Patent

[11] 3,603,927

[72] Inventor Arthur P. Osborne
      Wellington, England
[21] Appl. No. 811,063
[22] Filed Mar. 27, 1969
[45] Patented Sept. 7, 1971
[73] Assignee Girling Limited
      Birmingham, England
[32] Priority Apr. 2, 1968
[33] Great Britain
[31] 15756/68

[54] FLUID LEVEL INDICATORS
     13 Claims, 5 Drawing Figs.
[52] U.S. Cl. .................................... 340/59,
                                  340/244 C, 73/295
[51] Int. Cl. ................................... B60q 1/00
[50] Field of Search ........................ 340/59, 244
        E, 244 C; 73/295, 304, 337/166, 161, 401, 142,
                                                    146

[56] References Cited
         UNITED STATES PATENTS
3,293,390  12/1966  Shaw ............... 340/59 (X)
3,453,579   7/1969  Cinquin ............ 337/161 (X)
         FOREIGN PATENTS
  545,384   8/1956  Belgium ............ 73/295

Primary Examiner—John W. Caldwell
Assistant Examiner—Glen R. Swann, III
Attorney—Holman & Stern ABSTRACT: In a fluid level indicator, particularly for a vehicle hydraulic braking system, a fusible link is mounted in the container within which the level of liquid is to be monitored. This link is connected in a circuit such that the link will not fuse provided it is covered, but if it becomes uncovered at any time it will fuse and operate some form of warning device.

FLUID LEVEL INDICATORS

BRIEF SUMMARY OF THE INVENTION

This invention relates to fluid level indicators, and is particularly, but not exclusively, concerned with a fluid level indicator for indicating when the level of fluid in the master cylinder reservoir of a hydraulic braking system falls below a predetermined value.

An indicator in accordance with the invention comprises a fusible link which is positioned in a container and is normally immersed in the fluid the level of which is to be indicated, means for passing current through the fusible link either continuously or intermittently, the arrangement being such that provided the link is covered by fluid it will not fuse, but when the link is not covered by the fluid it will fuse, and means operable on fusion of the link for giving a warning.

In the preferred embodiment where the link is mounted within the master cylinder reservoir of the hydraulic braking system of a road vehicle, the link is preferably disposed vertically away from the sides of the reservoir, in order to minimize risk of the link fusing as a result of surge of liquid when the vehicle is in motion. For the same reason, and also to minimize risk of mechanical damage, the link is preferably encapsulated in a glass or other capsule which is provided with orifices to permit in-flow and out-flow of the hydraulic brake fluid, these orifices restricting the out-flow of fluid during braking or cornering of the vehicle.

The link could be freely suspended in the reservoir, but preferably it is maintained under tension to ensure that the circuit will be broken when the link fuses. Whilst there are many materials which could be used for the link, there are several considerations which must be taken into account. Thus the link must not have too high a melting point, it must have a low resistance to minimize heat dissipation in the liquid and to ensure a low voltage drop across the link, and it must not undergo any electrolysis effects which could cause damage to the seals in the braking system. A particularly suitable material avoiding all these disadvantages is tin, and in one embodiment good results have been achieved with a tin wire having a diameter of five-thousandths of an inch. Such a wire fuses when a current of one amp is passed through it. Of course, the link will take a finite time to fuse when it is uncovered, and if desired the parameters can be chosen so that this time is sufficient to prevent the link fusing as a result of surges when the vehicle is in motion.

It will be appreciated that two or more links could be provided in a reservoir to give an indication of height of liquid in the reservoir, rather than merely a warning that a loss has occurred. Of course, in such an arrangement the links would need to be replaced from time to time, and in the particular embodiment of a road vehicle braking system, all that is in fact required is a warning.

BRIEF DESCRIPTION OF THE DRAWINGS

In the accompanying drawings.

DETAILED DESCRIPTION

Figure 1:
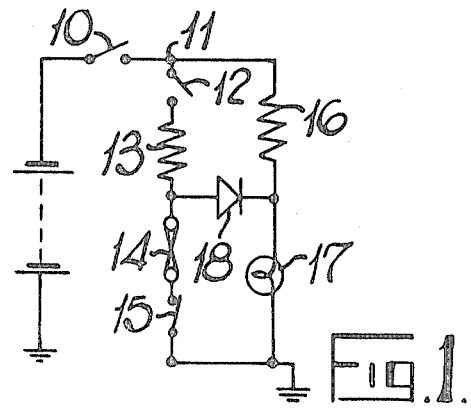
FIGS. 1 to 5 are circuit diagrams illustrating five examples of the invention as applied to a road vehicle hydraulic braking system having a master cylinder reservoir within which the fusible link is mounted.

Referring first to FIG. 1, the battery of the vehicle has its positive terminal earthed, and a terminal 11 associated with the warning device circuit is connected to the negative terminal of the battery through the vehicle ignition switch 10. The terminal 11 is earthed through parallel paths the first of which contains in series a switch 12 which is closed when the brake pedal of the vehicle is depressed, a resistor 13, the fusible link 14 and a normally closed switch 15, and the second of which contains a resistor 16 and a warning lamp 17. A diode 18 couples the two parallel circuits, the anode of the diode being connected to the junction of the resistor 13 and the fusible link 14, and the cathode of the diode 18 being connected to the junction of the resistor 16 and warning lamp 17.

When the ignition switch 10 is closed, current can flow through the resistor 16, and thence to earth through the warning lamp 17 and through the series circuit consisting of the diode 18, the link 14 and the switch 15. The resistor 16 has a high value, and the current flow through the lamp 17 is insufficient to illuminate it. Moreover, the current flow through the link 14 is insufficient to fuse it, even if the link 14 is uncovered.

When the brakes of the vehicle are applied, the switch 12 is closed automatically and a considerably increased current flows through the link 14. If the link 14 is covered, it does not fuse, and there is still insufficient current flow through the lamp 17 to illuminate it. However, if the link 14 is uncovered, it fuses, so breaking the path from the resistor 16 to earth by way of the link 14. All the current flowing through the resistors 13 and 16 now flows through the warning lamp 17, which is illuminated, and remains illuminated even when the switch 12 opens.

The purpose of the switch 15 is to test the circuit. When the switch 15 is opened, the warning lamp 17 is illuminated provided it is operating satisfactorily.

Although the circuit shown in FIG. 1 is satisfactory if the switch 12 is a switch operated by the brakes, it is not satisfactory if the switch 12 itself is to be used to operate the brake lights of the vehicle, because in these circumstances a point intermediate the switch 12 and resistor 13 would be connected to the brake light, so that current flowing through the resistor 16 would be diverted through the brake lights even when the link 14 fused, with the result that the lamp 17 would not be illuminated. If, therefore, it is desired to use the switch 12 as the switch for operating the brake lights, a further diode (not shown) is included in the circuit, on either side of the resistor 13, to prevent flow of current through the diode 18 and resistor 13 to the brake lights.

Figure 2:
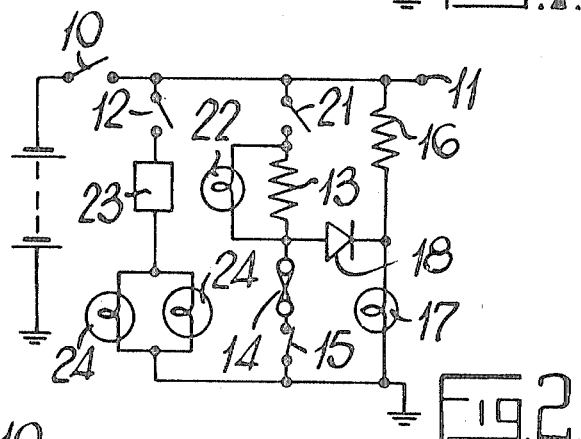

FIG. 2 illustrates a modification of FIG. 1 in which the brake light switch 12 is replaced by a relay contact 21, and the resistor 13 is bridged by a warning lamp 22. A further circuit from the terminal 11 to earth is completed through the brake light switch 12, a relay 23 which when energized closes the contact 21, and the brake lights 24. The arrangement is such that when the switch 12 closes, provided that both lights 24 are operating, the relay 23 is energized, and closes the contact 21. The lamp 22 is illuminated to show that the lamps 24 are operating satisfactorily, and the operation of the lamp 17 and its associated circuit is identical to FIG. 1. If either of the lamps 24 fails, the lamp 22 will not be illuminated when the brakes of the vehicle are applied because the current flowing through the relay coil 23 when only one of the lamps 24 is operating is reduced to a level at which the relay 23 does not close its associated contact 21.

Figure 3:
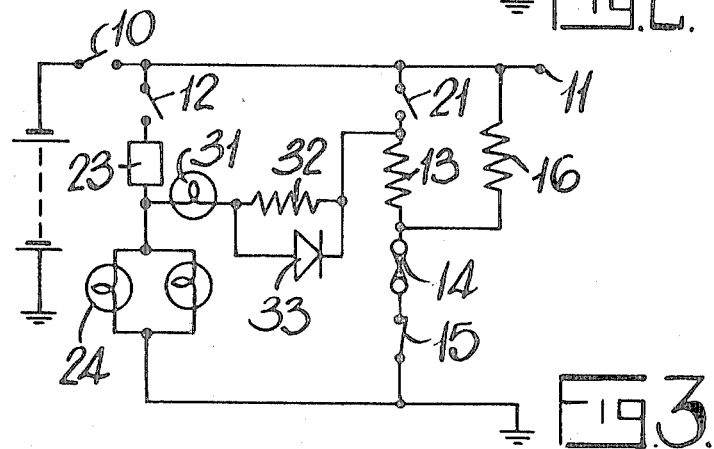

FIG. 3 shows a modification of FIG. 2 in which a single warning lamp is used to indicate failure of a stop lamp 24 or of the link 14. In this arrangement two parallel circuits are provided as in FIG. 2, one circuit including the switch 12, the relay 23 and the lamps 24, and the other including the contact 21, the resistor 13, the link 14 and the switch 15. The lamps 22, 17 and the diode 18 are omitted, and the resistor 16 is connected directly between the terminal 11 and the junction of the link 14 and resistor 13. Furthermore, a coupling circuit is provided between the junction of the relay 23 and lamps 24, and the junction of the contact 21 and resistor 13, this circuit including a warning lamp 31 and a resistor 32 in series, the resistor 32 being bridged by a diode 33. The resistor 16 provides a continuous current to the link 14 when the ignition switch is closed, this current being insufficient to fuse the link 14 even if it is not covered. Provided the link 14 has not fused, and the lamps 24 are operating satisfactorily, the potentials at the ends of the coupling circuit 31, 32, 33 are substantially equal and so the lamp 31 is not illuminated. If either or both of the lamps 24 should fail, then the resistance between the junction of winding 23 and lamp 31 and ground changes, so that the potentials at opposite ends of the coupling circuit are no longer equal, and the warning lamp 31 will be illuminated on closing of the switch 12. If the link 14 fails then again the potentials at opposite ends of the coupling circuit become unequal, and the lamp 31 will be illuminated by current flowing through the resistors 16, 13, 32 when the switch 12 is open, but the lamp 31 will be off when the switch 12 is closed. Thus the lamp 31 serves a dual purpose, one fault causing current flow through it in one direction and another fault causing current flow through it in the opposite direction. In the event that the link 14 should fuse and both warning lamps 24 should fail, the lamp 31 will not be illuminated, but in these circumstances operation of the test switch 15 will fail to illuminate the lamp 31, so showing either that both lamps 24 and the link 14 have failed, or that the lamp 31 has failed.

Figure 4:
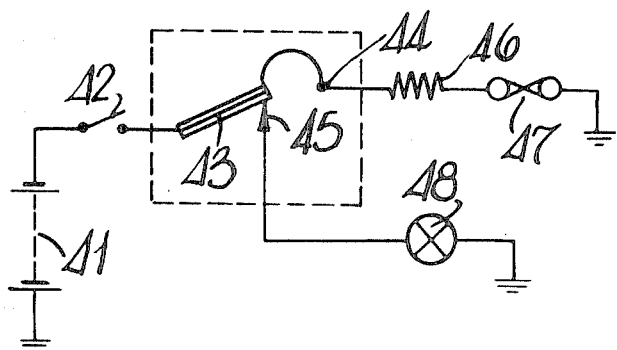

Referring now to the example shown in FIG. 4, a vehicle battery 41 has its positive terminal earthed and its negative terminal connected through a manually operable switch 42 to the movable contact 43 of a thermally operable switch. The switch makes permanent contact with a terminal 44, and in its cold condition also engages a contact 45. The contact 44 is connected through a resistor 46 and a fusible link 47 in series to earth, whilst the contact 45 is connected through a warning lamp 48 to earth.

The link 47 is mounted in the master cylinder reservoir as in the other examples, and when it is desired to test the level of fluid in the reservoir, the switch 42 is closed. The switch 42 can be a special switch for this purpose, or some other switch on the vehicle which is used as the testing switch as well. When the switch 42 is closed, current flows by way of the contact 43 to the parallel paths 44, 46, 47 and 45, 48. Assuming that the link 47 is covered, it does not fuse, but the warning lamp 48 still lights at this stage because the circuit is completed by way of terminal 45. However, the current flowing through the thermally operable switch moves the contact 43 out of engagement with the terminal 45 after a predetermined delay, and at this point the lamp 48 is extinguished. If the link 47 fuses at any time, then the heating circuit is broken and the contact 43 moves back into engagement with the terminal 45, so completing the circuit to the lamp 48. It will be appreciated that this arrangement has the advantage that each time the switch 42 is closed, the lamp 48 is tested.

Figure 5:
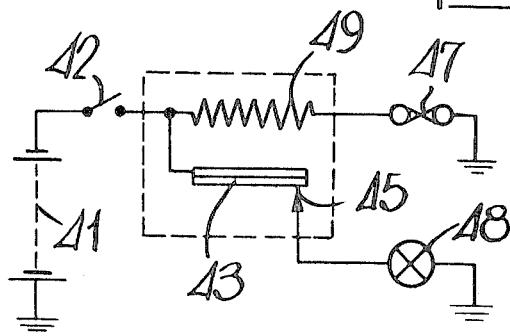

In the modification of FIG. 4 shown in FIG. 5, the thermal switch has a heater 49 connected in series with the switch 42 and link 47 across the battery. The contact 43 is no longer permanently connected to the link 47, but completes a circuit to the terminal 45 to to illuminate the lamp 48 in the cold condition. The heater moves the contact 43 out of engagement with the terminal 45 as in FIG. 4. The resistor 46 is no longer required, because the resistance of the heater 49 limits the current flowing through the link 47 to the desired value.

Having thus described our invention what we claim as new and desire to secure by Letters Patent is:

1. A fluid level indicator comprising a fusible link which is positioned in a container and is normally immersed in the fluid the level of which is to be indicated, the arrangement being such that when a current is passed through the link then provided the link is covered by fluid it will not fuse, but when the link is not covered by the fluid it will fuse, said indicator including a pair of supply lines, a first series circuit connected between the supply lines and including a switch, a first resistor and the fusible link, a second series circuit connected between the supply lines and including a second resistor and a warning device, and a diode connecting a point in the first circuit between the first resistor and link to a point in the second circuit between the second resistor and warning device, said diode being poled to prevent current flow through the first resistor to the warning device, current flow through the second resistor to the warning device being insufficient to energize the warning device and current flow through the second resistor and diode to the fusible link being insufficient to fuse the link, and the current flowing when the switch is closed being insufficient to energize the warning device, unless the link fuses.

2. An indicator as claimed in claim 1 in which the container is the master cylinder reservoir of a vehicle braking system, and the switch is closed each time the brake pedal of the vehicle is depressed.

3. An indicator as claimed in claim 2 in which current is supplied through the switch to the brake lamps of the vehicle, and a second diode is included in the circuit between the switch and the junction of the first diode and the first circuit, so that current cannot flow through the first diode to the brake lamps.

4. An indicator as claimed in claim 2 in which said switch is constituted by a relay contact, the coil of the relay being connected between the supply lines in series with the brake lamps and a switch for operating the brake lamps.

5. An indicator as claimed in claim 4 including a second warning device connected across the first resistor for indicating satisfactory operation of the brake lamps.

6. A fluid level indicator comprising a fusible link which is positioned in the master cylinder reservoir of a vehicle braking system, the fusible link normally being immersed in the fluid, and the arrangement being such that when a current is passed through the fusible link then provided the fusible link is covered by the fluid it will not fuse, but when the link is not covered by the fluid it will fuse, the indicator including a pair of supply lines, a first series circuit connected across the supply lines and including a switch which closes when the brake pedal of the vehicle is depressed, a relay coil, and the brake lamps of the vehicle in parallel, a second series circuit connected between the supply lines and including a normally open contact operable by the relay coil, a first resistor and a fusible link, a second resistor connected in parallel with said first resistor and said normally open contact, current flow through the second resistor being insufficient to fuse the link, and a coupling circuit joining a point in the first series circuit between the relay coil and brake lamps to a point in the second series circuit between the relay contact and first resistor, the coupling circuit including a warning device and a third resistor bridged by a diode, the arrangement being such that normally the potential at each end of said coupling circuit is the same so that no current flows through said warning device, but the warning device is energized on closing of the switch if a brake lamp should fail or the link should fuse, either of these faults causing an unbalance between the potentials at opposite ends of the coupling circuit, said diode short-circuiting said third resistor for one direction of current flow whereby said warning device distinguishes between said two faults.

7. An indicator as claimed in claim 6 including a resistor connected across the diode.

8. An indicator as claimed in claim 6 including a normally closed testing switch in series with the fusible link.

9. An indicator as claimed in claim 6 in which the link is freely suspended in the container.

10. An indicator as claimed in claim 6 in which the link is maintained under tension in the container.

11. An indicator as claimed in claim 6 in which the link is made from tin.

12. An indicator as claimed in claim 6 in which the link is disposed vertically, away from the sides of the container.

13. An indicator as claimed in claim 12 in which the link is encapsulated in a capsule having orifices through which fluid can flow into and out of the capsule.